US009208455B2

(12) United States Patent
Naito et al.

(10) Patent No.: US 9,208,455 B2
(45) Date of Patent: Dec. 8, 2015

(54) WIRELESS TERMINAL DEVICE, COMMUNICATION SYSTEM, AND CONTROL METHOD OF WIRELESS TERMINAL DEVICE

(75) Inventors: Masahiko Naito, Tokyo (JP); Katsutoshi Itoh, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 13/249,589

(22) Filed: Sep. 30, 2011

(65) Prior Publication Data

US 2012/0115440 A1 May 10, 2012

(30) Foreign Application Priority Data

Nov. 10, 2010 (JP) ................................ 2010-251993

(51) Int. Cl.
| | |
|---|---|
| *H04M 3/00* | (2006.01) |
| *G06Q 10/00* | (2012.01) |
| *H04L 29/06* | (2006.01) |
| *H04W 12/06* | (2009.01) |
| *H04W 8/20* | (2009.01) |
| *H04W 76/00* | (2009.01) |
| *H04W 88/02* | (2009.01) |

(52) U.S. Cl.
CPC ............ *G06Q 10/00* (2013.01); *H04L 63/0853* (2013.01); *H04W 12/06* (2013.01); *H04W 8/20* (2013.01); *H04W 8/205* (2013.01); *H04W 76/007* (2013.01); *H04W 88/02* (2013.01)

(58) Field of Classification Search
CPC .... H04L 63/0853; H04W 12/06; H04W 8/20; H04W 8/205

USPC ......................................... 455/411, 418, 419
See application file for complete search history.

(56) References Cited

U.S. PATENT DOCUMENTS

| | | | |
|---|---|---|---|
| 6,868,282 B2 * | 3/2005 | Carlsson ....................... 455/558 |
| 2005/0075137 A1 | 4/2005 | Reemtsma | |
| 2007/0004457 A1 * | 1/2007 | Han ............................... 455/558 |
| 2008/0261561 A1 * | 10/2008 | Gehrmann .................... 455/411 |
| 2009/0077643 A1 | 3/2009 | Schmidt et al. | |

(Continued)

FOREIGN PATENT DOCUMENTS

| | | |
|---|---|---|
| CN | 101663903 A | 3/2010 |
| JP | 09-182158 | 7/1997 |

(Continued)

OTHER PUBLICATIONS

U.S. Appl. No. 13/240,037, filed Sep. 22, 2011, Naito et al.

(Continued)

*Primary Examiner* — Barry Taylor
(74) *Attorney, Agent, or Firm* — Oblon, McClelland, Maier & Neustadt, L.L.P.

(57) ABSTRACT

A wireless terminal device includes: a transmission control unit which transmits a transfer request which is for requesting a use right of contract authentication information relating to a wireless business operator providing wireless connection services, which is information held by a second wireless terminal device as another wireless terminal device, via a wireless line when a predetermined operation is input; a receiving unit which receives transfer information which is transmitted via the wireless line in response to the transfer request for transferring the use right; and a control unit which sets valid contract authentication information based on the received transfer information.

15 Claims, 12 Drawing Sheets

(56) References Cited

U.S. PATENT DOCUMENTS

| | | | |
|---|---|---|---|
| 2010/0062808 A1 | 3/2010 | Cha et al. | |
| 2010/0069039 A1 | 3/2010 | Kawamura et al. | |
| 2010/0093342 A1* | 4/2010 | Ramachandra Rao et al. | 455/432.1 |
| 2011/0028126 A1* | 2/2011 | Lim et al. | 455/411 |
| 2012/0102556 A1* | 4/2012 | Tapia et al. | 726/7 |
| 2012/0129498 A1* | 5/2012 | Morikuni et al. | 455/411 |
| 2012/0281835 A1* | 11/2012 | Tysowski | 380/270 |

FOREIGN PATENT DOCUMENTS

| | | |
|---|---|---|
| JP | 2008-011416 | 1/2008 |
| JP | 2008-210301 | 9/2008 |
| JP | 2009-027416 | 2/2009 |
| JP | 2010-532107 | 9/2010 |
| WO | WO 2010/027765 A2 | 3/2010 |

OTHER PUBLICATIONS

Extended European Search Report issued Mar. 2, 2012, in European Patent Application No. 11183554.2.

Office Action issued in Apr. 15, 2014 in Japanese Patent Application No. 2010-251993.

Office Action issued on Aug. 26, 2014 in Japanese Patent Application No. 2010-251993.

Office Action issued Jan. 6, 2015 in Japanese Patent Application No. 2010-251993.

Office Action issued on Jun. 3, 2015 in Chinese Patent Application No. 201110353903.4, along with its English translation.

* cited by examiner

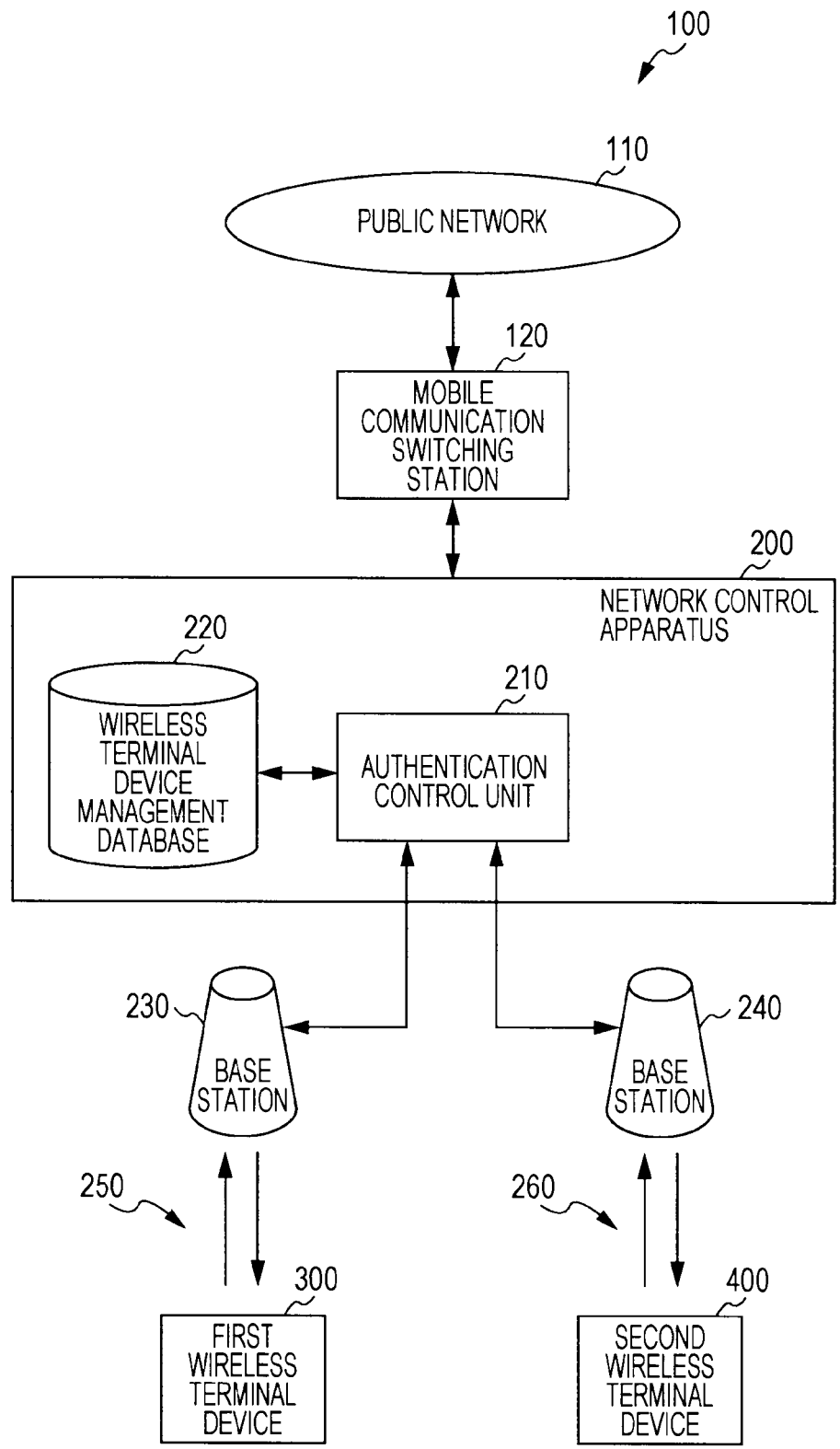

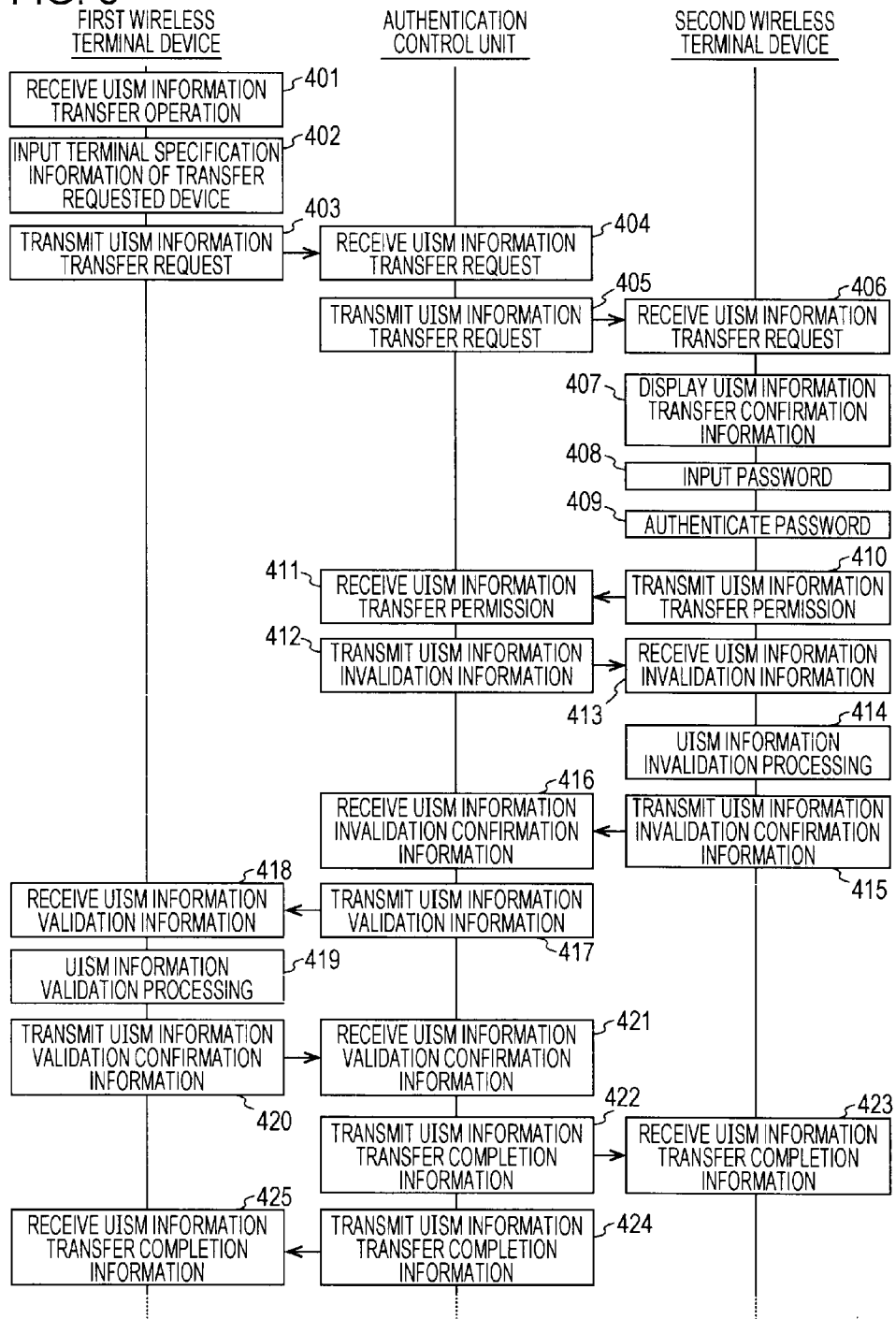

FIG. 11

| | TELEPHONE NUMBER | E-MAIL ADDRESS | TERMINAL SPECIFICATION NUMBER | VALIDITY INFORMATION |
|---|---|---|---|---|
| 1 | 090-1111-OOOO | aaa@bbb.cc.jp | IME#1 | INVALID |
| 2 | 090-2222-OOOO | ffff@bbb.cc.jp | IME#2 | VALID |
| 3 | 090-3333-OOOO | gggg@ccc.dd.jp | IME#3 | INVALID |
| ⋮ | ⋮ | ⋮ | ⋮ | ⋮ |
| M | 090-OOOO-OOOO | hhhh@xxx.yy.jp | IME#M | INVALID |

WIRELESS TERMINAL DEVICE, COMMUNICATION SYSTEM, AND CONTROL METHOD OF WIRELESS TERMINAL DEVICE

BACKGROUND

The present disclosure relates to a wireless terminal device, and particularly to a wireless terminal device connected to a public wireless network, a communication system provided with a wireless terminal device, and a control method of a wireless terminal device.

In the related art, a wireless terminal device connected to a public wireless network has become widespread. For example, as a mobile wireless terminal device, a mobile phone, a device for data communication are known. In addition, as a fixed type wireless terminal device, a wireless terminal device for the purpose of data collection of an automatic vending machine is known.

In recent years, as wireless business operators which provide wireless connection services to wireless terminal devices, there are a number of wireless business operators in each country or region.

Here, in order for the wireless terminal device to connect to the public wireless network, it is necessary to attach to the wireless terminal device a card (a card which maintains contract authentication information (a so-called UICC card)) issued by a wireless business operator which provides a wireless connection service. In addition, a technique of using the card (UICC card) to be attached to the wireless terminal device for storing other information has been proposed.

For example, a communication system which adds a credit function of dealing with electronic money and the like and a function as a high-capacity memory card to the UICC card along with a USIM function of dealing with subscriber information has been proposed, for example (see Japanese Unexamined Patent Publication Application No. 2008-210301, for example).

SUMMARY

Since a credit function and a function as a high-capacity memory card are added to a UICC card along with a USIM function according to the above technique in the related art, it is possible to integrate various services in relation to the wireless terminal device on the UICC card.

According to the above technique in the related art, only the wireless connection services via the wireless business operator which has issued the UICC card being attached to the wireless terminal device are available when the wireless terminal device receives the wireless connection services, except for specific cases (in case of emergency, and the like).

In recent years, there are more users who personally own a plurality of wireless terminal devices. It is possible to consider a user who personally owns a plurality of wireless terminal devices attaches a UICC card to each wireless terminal device as a target of use when the user uses each wireless terminal device. Alternatively, it is possible to consider the user uses one UICC card for a plurality of wireless terminal devices.

When a UICC card is attached to each wireless terminal device as a target of use, however, burden of expense in relation to the wireless connection services is increased by an amount corresponding to the increase in the number of the UICC cards. In addition, when one UICC card is used for a plurality of wireless terminal devices, it is necessary to replace the UICC card between wireless terminal devices every time the wireless terminal device as a target of use is changed. In such a case, the replacement operation becomes complicated. Moreover, when one UICC card is used for a plurality of wireless terminal devices, a case is also assumed in that the wireless terminal device to which the UICC card is being attached is not present near the user. In such a case, it is not difficult to change the wireless terminal device as a target of use, and there is a concern in that a desired function may not be available.

It is desirable to easily share contract authentication information between a plurality of wireless terminal devices.

According to a first embodiment of the present disclosure, there are provided a wireless terminal device, a control method thereof, and a program which causes a computer to execute the method, the wireless terminal device including: a transmission control unit which transmits a transfer request which is for requesting a use right of contract authentication information relating to a wireless business operator providing wireless connection services, which is information held by a second wireless terminal device as another wireless terminal device, via a wireless line when a predetermined operation is input; a receiving unit which receives transfer information which is transmitted via the wireless line in response to the transfer request for transferring the use right; and a control unit which sets valid contract authentication information based on the received transfer information. With such a configuration, an effect is achieved in which valid contract authentication information is set based on received transfer information if a transfer request is transmitted via a wireless line when a predetermined operation is input and the transfer information is received via the wireless line in response to the transfer request.

In addition, according to the first embodiment, the transfer information may include validation information which is for validating the contract authentication information held by a holding unit, and the control unit may set the valid contract authentication information by validating the contract authentication information held by the holding unit based on the validation information included in the received transfer information. In so doing, an effect is achieved in which the valid contract authentication information is set by validating the contract authentication information held in the holding unit based on the validation information included in the received transfer information.

In addition, according to the first embodiment, the transmission control unit may transmit the transfer request to a network control apparatus with a database which manages the contract authentication information which is respectively held by the wireless terminal device and the second wireless terminal device, and the control unit may set the valid contract authentication information based on the transfer information which is transmitted from the network control apparatus based on management by the database. In so doing, an effect is achieved in which the valid contract authentication information is set based on the transfer information transmitted from the network control apparatus after transmitting the transfer request to the network control apparatus.

In addition, according to the first embodiment, the network control apparatus may perform control so as to validate the contract authentication information held by the holding unit by transmitting the transfer information to the wireless terminal device in response to the transfer request and may perform control so as to invalidate the contract authentication information held by the second wireless terminal device, and the control unit may set the valid contract authentication information based on control by the network control apparatus. In so doing, an effect is achieved in which the valid contract authentication information is set based on the control by the network control apparatus.

In addition, according to the first embodiment, the transfer information may include the contract authentication information held by the second wireless terminal device, the transmission control unit may transmit the transfer request to the second wireless terminal device, and the control unit may set the valid contract authentication information by causing the holding unit to hold the contract authentication information included in the received transfer information. In so doing, an effect is achieved in which the valid contract authentication information is set by transmitting the transfer request to the second wireless terminal device and causing the holding unit to hold the contract authentication information included in the received transfer information.

In addition, according to the first embodiment, the receiving unit may receive the transfer information transmitted from the second wireless terminal device after the contract authentication information held by the second wireless terminal device is invalidated. In so doing, an effect is achieved in which the transfer information transmitted from the second wireless terminal device is received after invalidating the contract authentication information held by the second wireless terminal device.

In addition, according to the first embodiment, the transmission control unit may transmit the transfer request via the wireless line by limited connection which is only limited connection performed without using the contract authentication information relating to the wireless business operator. In so doing, an effect is achieved in which the transfer request is transmitted via the wireless line by the limited connection which is only limited connection without using the contract authentication information relating to the wireless business operator.

In addition, according to the first embodiment, the predetermined operation may be an instructing operation by a user who instructs the transfer request. In so doing, an effect is achieved in which the transfer request is transmitted via the wireless line when the instructing operation by the user who instructs the transfer request is received.

According to a second embodiment of the present disclosure, there are provided a wireless terminal device, a control method thereof, and a program which causes a computer to execute the method, the wireless terminal device including: a receiving unit which receives a transfer request which is for requesting a use right of contract authentication information relating to a wireless business operator providing wireless connection services, which is information held by a holding unit; and a control unit which transmits transfer information which is for transferring the use right when the transfer request is received, via a wireless line. In so doing, an effect is achieved in which the transfer information is transmitted via the wireless line when the transfer request is received from the first wireless terminal device via the wireless line.

In addition, according to the second embodiment, the control unit may cause a display unit to display a confirmation screen, which allows a user to confirm the transfer of the use right when the transfer request is received, and transmits the transfer information via the wireless line when an operation of permitting the transfer of the use right is input after the display of the confirmation screen. In so doing, an effect is achieved in which the confirmation display is displayed when the transfer request is received and the transfer information is transmitted via the wireless line when the operation of permitting the transfer of the use right is input after the display of the confirmation screen.

According to a third embodiment of the present disclosure, there are provided a communication system, a control method thereof, and a program which causes a computer to execute the method, the communication system including: a first wireless terminal device including a transmission control unit which transmits a transfer request which is for requesting a use right of contract authentication information relating to a wireless business operator providing wireless connection services, which is information held by a second wireless terminal device, via a wireless line when a predetermined operation is input, a receiving unit which receives transfer information which is transmitted via the wireless line in response to the transfer request for transferring the use right, and a control unit which sets valid contract authentication information based on the received transfer information; and a second wireless terminal device including a receiving unit which receives a transfer from the first wireless terminal device via the wireless line and a control unit which transmits transfer information when the transfer request is received, via a wireless line. In so doing, an effect is achieved in which the first wireless terminal device sets valid contract authentication information based on received transfer information if the transfer request is transmitted via the wireless line when the predetermined operation is input and if the transfer information is received via the wireless line in response to the transfer request while the second wireless terminal device transmits the transfer information via the wireless line if the transfer request is received from the first wireless terminal device via the wireless line.

According to the exemplary embodiments of the present disclosure, it is possible to achieve an excellent effect in which contract authentication information can be easily shared between a plurality of wireless terminal devices.

BRIEF DESCRIPTION OF THE DRAWINGS

FIG. 2 is a block diagram showing a system configuration example of a communication system according to the first embodiment of the present disclosure;

FIG. 8 is a sequence chart showing communication processing between each apparatus included in a communication system according to the first embodiment of the present disclosure;

FIG. 11 is a diagram schematically showing a wireless terminal device management database according to the first embodiment of the present disclosure.

DETAILED DESCRIPTION OF EMBODIMENTS

Hereinafter, description will be given of embodiments for practicing this disclosure (hereinafter, referred to as embodiments). The description will be given in the following order.

1. First embodiment (USIM (Universal Subscriber Identity Module) information transfer control: an example in which USIM information is shared among a plurality of wireless terminal devices which are present at a close distance)

2. Second embodiment (USIM information transfer control: an example in which USIM information is shared among a plurality of wireless terminal devices which are present at a far distance)

1. First Embodiment

Use Example of Wireless Terminal Device

Figure 1A:
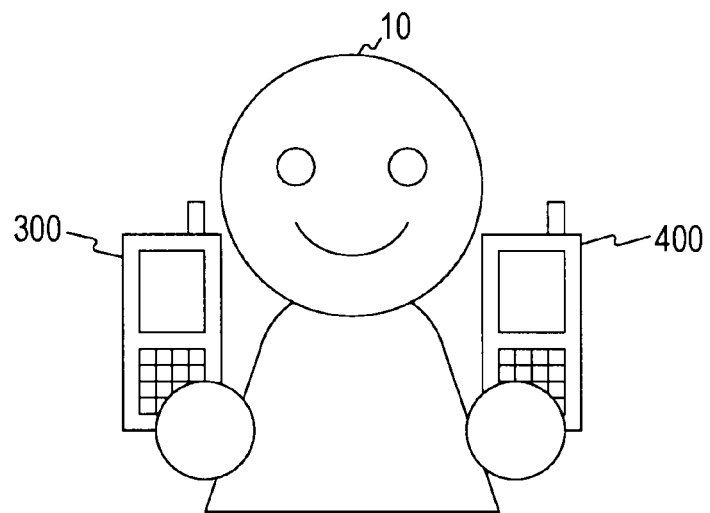
FIGS. 1A and 1B are diagrams simplifying and showing a usage example of a plurality of wireless terminal devices according to a first embodiment of the present disclosure.
Figure 1B:
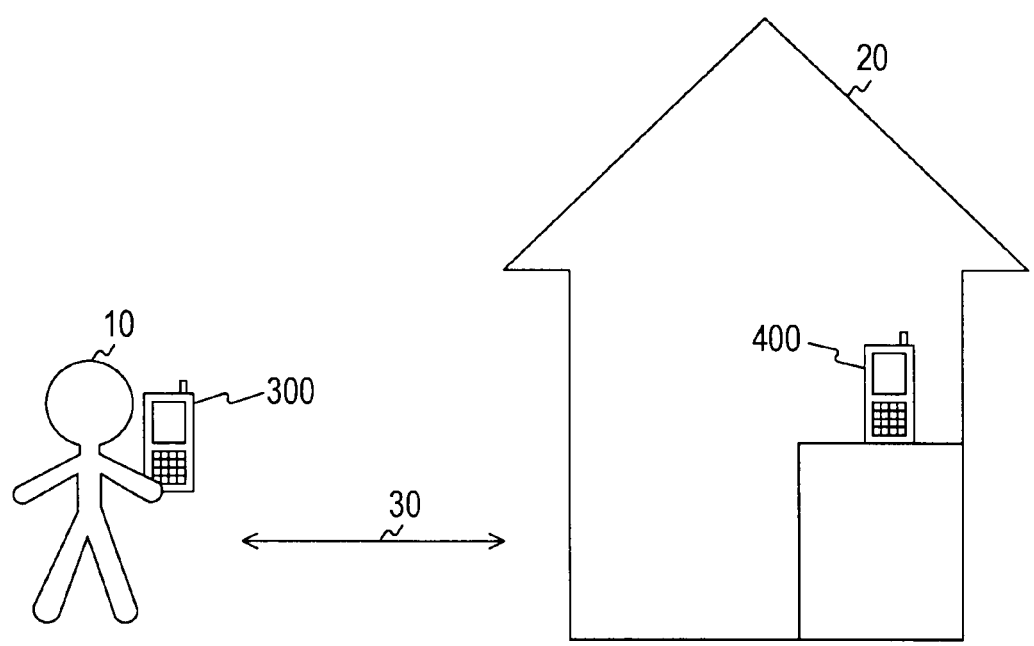

FIGS. 1A and 1B are diagrams simplifying and showing a usage example of a plurality of wireless terminal devices according to a first embodiment of the present disclosure.

FIG. 1A shows a state in which a user 10 holds and uses a plurality of wireless terminal devices (first wireless terminal device 300 and a second wireless terminal device 400). FIG. 1B shows a state in which a user 10 holds and uses a wireless terminal device (first wireless terminal device 300) while another wireless terminal device (second wireless terminal device 400) is placed at a relatively far place (far away by a distance shown by an arrow 30). For example, a case is assumed in which the user 10 who left the second wireless terminal device 400 at home 20 uses the first wireless terminal device 300 at their office.

[Configuration Example of Communication System]

FIG. 2 is a block diagram showing a system configuration example of a communication system 100 according to the first embodiment of the present disclosure.

The communication system 100 is provided with a public network 110, a mobile communication switching station 120, a network control apparatus 200, base stations 230 and 240, a first wireless terminal device 300, and a second wireless terminal device 400.

The public network 110 is public network such as a telephone network, the Internet, or the like.

The mobile communication switching station 120 is an interface (MSC (Mobile services Switching Center)) for a fixed network (public network 110) and a mobile network.

The base stations 230 and 240 are mobile communication base stations (Node B) which connect the first wireless terminal device 300 and the second wireless terminal device 400, and the network control apparatus 200 via the wireless lines 250 and 260.

For example, the first wireless terminal device 300 is connected to the base station 230 via the wireless line 250 and to the network control apparatus 200 via the base station 230 in the communication system 100. Similarly, the second wireless terminal device 400 is connected to the base station 240 via the wireless line 260 and to the network control apparatus 200 via the base station 240. In addition, each of the first wireless terminal device 300 and the second wireless terminal device 400 can be connected to any of the base stations 230 and 240 in accordance with the position of use.

The network control apparatus 200 is a communication control apparatus managed by a wireless business operator which provides a wireless connection service and is provided with an authentication control unit 210 and a wireless terminal device management database 220.

The authentication control unit 210 is for performing authentication control of wireless terminal devices connected via the base stations 230 and 240. Here, the authentication control unit 210 authenticates only the wireless terminal devices which hold valid USIM information (contract authentication information) from among the wireless terminal devices connected via the base stations 230 and 240 except for specific cases. Here, the USIM information is one example of contract authentication information, and the contract authentication information is information including telephone subscriber (subscriber) information and authentication key (Authentication) information. In addition, detailed description will be given of specific cases with reference to FIG. 3. In addition, the network control apparatus 200 connects the authenticated wireless terminal device to the public network 110 via the mobile communication switching station 120.

The wireless terminal device management database 220 is a database with which the wireless business operator which provides the wireless connection service manages one or a plurality of wireless terminal devices. In addition, detailed description will be given of the wireless terminal device management database 220 with reference to FIG. 4 and the like.

[Connection Example at the Time of USIM Information Transfer Request]

Here, description will be given of a connection method by which a wireless terminal device without valid USIM information connects to the public network 110.

A general mobile phone terminal can achieve connection for the purpose of an emergency (Emergency Call) even when the USIM information is not held (that is, when a UICC card is not attached). Such purpose of emergency includes cases of calling the police, the fire department, and the like.

For example, a mobile phone in a state in which the USIM information is not held and in the state in which no telephone call is being made is assumed. This mobile phone terminal is in a state in which an arbitrary base station (for example, a base station with a high radio wave strength) available without specifying a wireless business operator is selected (a camped on any cell mode from among idle modes). In such a state, the mobile phone transmits EMERGENCY SETUP SIGNAL to MSC via the mobile communication base station and RNC as an emergency call only when the emergency call phone number (emergency call number) registered in advance is input by the user. In so doing, the mobile phone terminal terminates the idle mode, shifts to the connected mode, and is brought to be in a state in which a telephone call is available.

According to the first embodiment of the present disclosure, it becomes possible to temporarily access the network (public network 110) in order to perform USIM information (use right of USIM information) transfer request by expanding the aforementioned connection method.

For example, it is possible to temporarily access the network by the user calling a dedicated phone number for USIM information transfer request. In addition, it is also possible to make a configuration such that a call is made to the dedicated phone number for temporary access to the network when a user operation is performed with the use of an operation member (a button or the like) provided on the menu screen (the display screen 500 shown in FIG. 6A, for example) or the side surface of the device.

For the access to the network, random access processing defined by 3GPP standards of a mobile communication system is used. For example, it is possible to set a priority (Access Category) to the random access, and it is possible to set a priority (Access Category) for the USIM information transfer request. With such a configuration, it is possible to set a priority (Access Category) which is different from that for the emergency use (Emergency Call).

For example, when the wireless terminal device (requesting wireless terminal device) makes access with a priority (Access Category) for USIM information transfer request, limited network connection is provided to the requesting wireless terminal device. Then, after the permission of the limited connection to the requesting wireless terminal device, the requesting wireless terminal device is notified of the information from the USIM information transfer requested wireless terminal device (requested wireless terminal device) (information relating to the USIM information transfer request).

As described above, when the requesting wireless terminal device without valid USIM information connects to the network through the limited connection, the network maintains the limited connection to the requesting wireless terminal device. The network secures the ordinary connection to the requested wireless terminal device while maintaining such limited connection, and the communication of the information relating to the USIM information transfer request becomes available.

Figure 3:
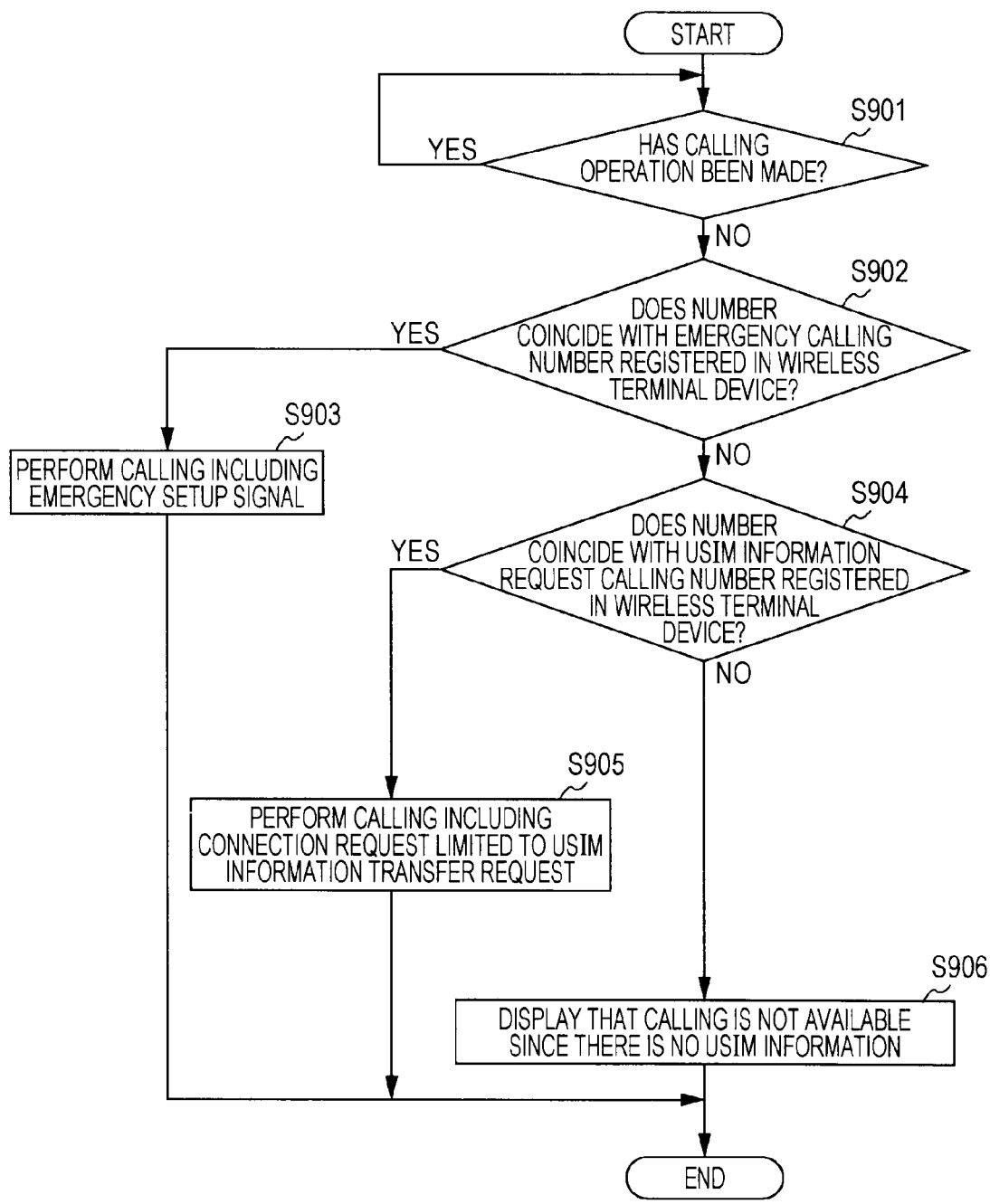
FIG. 3 is a flowchart showing one example of procedures of communication processing by a wireless terminal device according to the first embodiment of the present disclosure.

FIG. 3 is a flowchart showing an example of procedures of communication processing by the wireless terminal device according to the first embodiment of the present disclosure. In this example, description will be given of a case in which the limited connection is made by a call operation in the wireless terminal device without valid USIM information. In addition, an example will be shown in which a USIM information request call number is registered in the wireless terminal device for the limited connection and the USIM information request call number is used when the limited connection is made.

First, it is determined whether or not the call operation has been made (Step S901), and monitoring is continued when the call operation has not been made.

When the call operation has been made (Step S901), it is determined whether or not the number input through the call operation coincides with the emergency call number registered in the wireless (Step S902). When the number input through the call operation coincides with the emergency call number (Step S902), a call including an emergency setup signal is made (Step S903). In so doing, the wireless terminal device terminates the idle mode and is brought to be in the connected mode, which is a state where telephone call is available.

On the other hand, when the number input through the call operation does not coincide with the emergency call number (Step S902), it is determined whether or not the number input through the call operation coincides with the USIM information request call number registered in the wireless terminal device (Step S904). When the number input through the call operation coincides with the USIM information request call number (Step S904), a call including a connection request which is limited to the USIM information transfer request is made (Step S905). In so doing, the wireless terminal device terminates the idle mode and is brought to be in the connected mode, which is a state where a telephone call is available.

In addition, when the number input through the call operation does not coincide with the USIM information request call number (Step S904), display is performed so as to show that sending is not available since valid USIM information is not held (Step S906).

[Configuration Example of Wireless Terminal Device Management Database]

Figure 4:
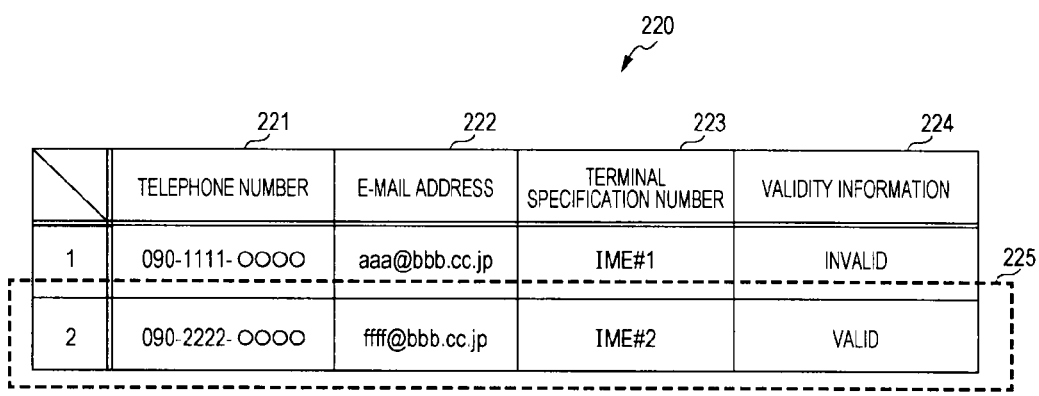
FIG. 4 is a diagram schematically showing wireless terminal device management database according to the first embodiment of the present disclosure.

FIG. 4 is a diagram schematically showing a wireless terminal device management database 220 according to the first embodiment of the present disclosure.

The wireless terminal device management database 220 is a database which manages the USIM information respectively held by the first wireless terminal device 300 and the second wireless terminal device 400. Specifically, the wireless terminal device management database 220 associates and stores a phone number 221, an E-mail address 222, terminal specifying information 223, and validity information 224. Such information is stored on the wireless terminal device management database 220 based on the input by the user 10 with the use of the first wireless terminal device 300 or the second wireless terminal device 400, for example. In addition, the wireless business operator which provides the wireless connection service may store such information on the wireless terminal device management database 220 based on the contract with the user 10.

The phone number 221 stores the phone number of the wireless terminal device. The E-mail address 222 stores the E-mail address of the wireless terminal device. In addition, the phone number and the E-mail address of the wireless terminal device is specification information which specifies the wireless terminal device, which is used for the USIM information (use right of USIM information) transfer request.

The terminal specifying information 223 stores the terminal specifying number of the wireless terminal device. The terminal specifying information is specification information which specifies the wireless terminal device and stores IMEI (International Mobile Equipment Identity), for example. In FIG. 4, it is assumed that the "IME#1" of the terminal specifying information 223 corresponds to the first wireless terminal device 300 while "IME#2" of the terminal specifying information 223 corresponds to the second wireless terminal device 400.

The validity information 224 stores information representing whether the USIM information held in the wireless terminal device is valid or invalid. In FIG. 4, the wireless terminal device with the valid USIM information is shown with "valid" while the wireless terminal device with invalid USIM information is shown with "invalid" for the simplification of the drawing. In addition, information relating to the wireless terminal device with valid USIM information is surrounded by a rectangular 225 and is shown.

[Configuration Example of Wireless Terminal Device]

Figure 5:
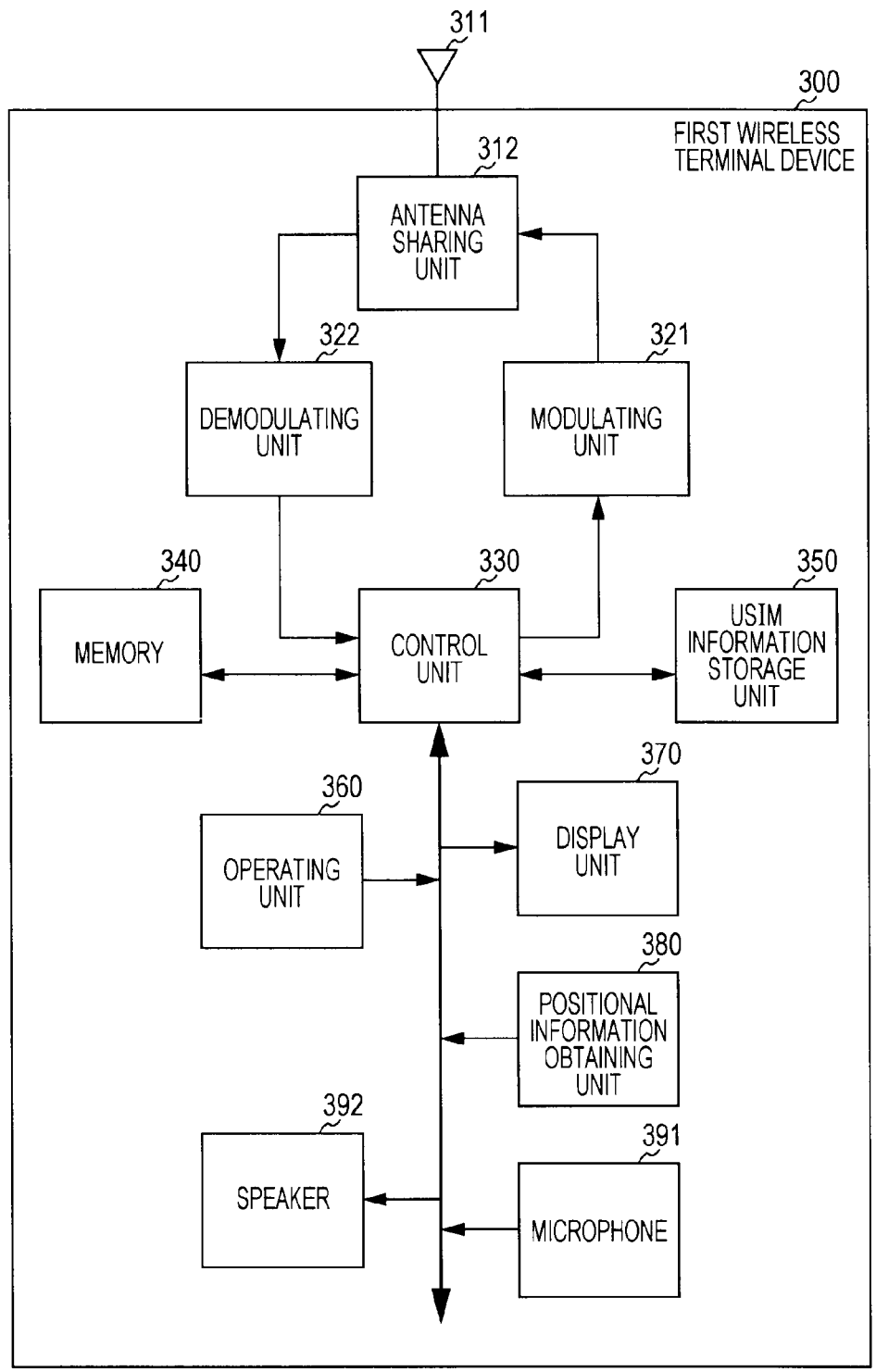
FIG. 5 is a block diagram showing an internal configuration example of a first wireless terminal device according to the first embodiment of the present disclosure.

FIG. 5 is a block diagram showing an internal configuration example of the first wireless terminal device 300 according to the first embodiment of the present disclosure. Since the internal configuration of the second wireless terminal device 400 is the same as that of the first wireless terminal device 300, the description thereof will be omitted here.

The first wireless terminal device 300 is provided with an antenna 311, an antenna sharing unit 312, a modulating unit 321, a demodulating unit 322, a control unit 330, a memory 340, and a USIM information storage unit 350. In addition, the first wireless terminal device 300 is provided with an operating unit 360, a display unit 370, a positional information obtaining unit 380, a microphone 391, and a speaker 392.

The first wireless terminal device 300 is realized by a mobile phone device capable of performing telephone call and data communication, for example.

For example, when receiving processing is performed, the radio wave received by the antenna 311 is demodulated by the demodulating unit 322 via the antenna sharing unit 312, and the demodulated received data is supplied to the control unit 330. When the receiving processing is call receiving processing, the demodulated received data (audio data) is output as audio from the speaker 392 via the control unit 330. In addition, each of the antenna 311, the antenna sharing unit 312, and the demodulating unit 322 is an example of the receiving unit described in the appended claims.

For example, when sending processing is performed, the sent data output by the control unit 330 is modulated by the modulating unit 321, and the modulated sent data is sent from the antenna 311 via the antenna sharing unit 312. When the sending processing is call sending processing, the audio data input from the microphone 391 is modulated by the modulating unit 321 via the control unit 330, and the modulated sent data (audio data) is sent from the antenna 311 via the antenna sharing unit 312.

The control unit 330 performs various kinds of control based on a control program stored on the memory 340. The control unit 330 is a microprocessor, for example. For example, the control unit 330 is connected to the modulating unit 321 and the demodulating unit 322 to communicate various data with the network control apparatus 200 connected via the base stations 230 and 240. In addition, the control unit 330 is an example of the transmission control system and the control system described in the appended claims.

The memory 340 is a memory storing the control program, with which the control unit 330 performs various kinds of control, sent data, received data, and the like. The memory 340 is a ROM (Read Only Memory) or a RAM (Random Access Memory).

The USIM information storage unit 350 is a memory which holds the USIM information (contract authentication information). As the USIM information storage unit 350, a UICC (Universal Integrated Circuit) card may be used, for example, or a dedicated memory for securely maintaining the USIM information may also be used. In addition, when a UICC card is used as the USIM information storage unit 350, not only the UICC card in which the USIM information is fixedly written, but the UICC card for which validation processing and invalidation processing of the USIM information can be performed is used. That is, a UICC card, for which validation processing and invalidation processing of the USIM information can be performed by the control unit 330 based on the transfer information which has been received from the antenna 311 and demodulated, is used.

Alternatively, the UICC card for which it is possible to perform rewriting processing of the USIM information is used. The validation processing and the invalidation processing defined in the 3GPP (Third Generation Partnership Project) can be performed as the aforementioned validation processing and the invalidation processing of the USIM information. Such processing is performed at a mobile phone device shop, for example. In addition, the USIM information storage unit 350 is an example of the holding unit described in the appended claims.

When a user's instruction operation (a predetermined operation), which is for instructing the transfer request for requesting the transfer of the use right of the USIM information according to the wireless business operator which provides the wireless connection service, is received by the operating unit 360, the control unit 330 transmits the transfer request via the wireless line. The transfer request is a transfer request for requesting the transfer of the use right of the USIM information held by the USIM information storage unit 350 in the second wireless terminal device 400. The control unit 330 transmits the transfer request through the limited connection which is for limited connection without using the USIM information, via the wireless line. Here, the use right of the USIM information is a right of using the USIM information. It is possible to transfer the use right of the USIM information through the validation processing and the invalidation processing of the USIM information, for example. Alternatively, it is possible to transfer the use right of the USIM information through the transfer processing of the USIM information.

When the transfer information (information for transferring the use right of the USIM information) sent via the wireless line in response to the transmission request is received, the control unit 330 sets valid USIM information based on the received transfer information. The transfer information is transmitted by the authentication control unit 210 based on the management of the wireless terminal device management database 220.

In addition, when the transfer of the use right of the USIM information is performed through the validation processing and the invalidation processing of the USIM information, the transfer information includes validation information which is for validating the USIM information held by the USIM information storage unit 350. Then, the control unit 330 sets valid USIM information by validating the USIM information held by the USIM information storage unit 350 based on the validation information included in the received transfer information.

In addition, the network control apparatus 200 performs control to validate the USIM information held by the USIM information storage unit 350 by transmitting the transfer information to the first wireless terminal device 300 in response to the transfer request. Moreover, the network control apparatus 200 performs control to invalidate the USIM information held by the USIM information storage unit 350 in the second wireless terminal device 400.

When the transfer of the use right of the USIM information is performed through the transfer processing of the USIM information, the transfer information includes the USIM information held by the USIM information storage unit 350 in the second wireless terminal device 400. When such transfer is performed, the control unit 330 transmits the transfer request to the second wireless terminal device 400. After the transmission of such a transfer request the USIM information held by the second wireless terminal device 400 is invalidated, and the transfer information is transmitted from the second wireless terminal device 400 or the network control apparatus 200. Then the control unit 330 sets the valid USIM information by causing the USIM information storage unit 350 to store the USIM information held in the received transfer information.

When the first wireless terminal device 300 is the transfer requested terminal, and the transfer request is received, the control unit 330 transmits the transfer information to the transfer requesting terminal via the wireless line. In such a case, the control unit 330 causes the display unit 370 to display a confirmation screen (display screens 520 and 530 shown in FIG. 7, for example) which is for allowing the user to confirm the transfer of the use right of the USIM information held by the USIM information storage unit 350 when the transfer request is received. In addition, when an input for permitting the transfer of the use right of the USIM information held by the USIM information storage unit 350 is received by the operating unit 360 after the display of the confirmation screen, the control unit 330 transmits the transfer information via the wireless line.

The operating unit 360 is an operation receiving unit which receives an input by a user and outputs a signal in accordance with the received input to the control unit 330. The operating unit 360 is provided with various keys such as numerical keys, alphabetical keys, and the like and receives instruction operation (a predetermined operation) by a user who instructs the transfer of the use right of the USIM information according to the wireless business operator which provides the wireless connection service.

The display unit 370 is a display unit which displays various information (character information, time information, and the like) based on the control by the control unit 330. The display unit 370 displays various kinds of information (display screens shown in FIGS. 6A to 7B, for example) relating to the transfer processing of the use right of the USIM information. In addition, it is possible to use a display panel such as an organic EL (Electro Luminescence) panel, an LCD (Liquid Crystal Display) panel, or the like, as the display unit 370. In addition, the operating unit 360 and the display unit 370 can be integrally configured with the use of a touch panel with which the user can input operations by contacting or approaching the display surface with their finger.

The positional information obtaining unit 380 obtains positional information indicating a position where the first wireless terminal device 300 is present and outputs the obtained positional information to the control unit 330. The positional information obtaining unit 380 can be realized by a GPS unit which calculates the positional information based on the GPS signal received by a GPS signal receiving antenna (not shown). The calculated positional information includes various kinds of data relating to a position such as latitude, longitude, altitude, and the like. In addition, a positional information obtaining apparatus which obtains the positional information by another obtaining method of the positional information may be used. For example, a positional information obtaining apparatus which derives the positional information with the use of access point information by the wireless LAN (Local Area Network) present in the circumference and obtains the positional information may also be used.

[Communication Example Between Terminals]

FIGS. 6A to 7B are diagrams showing display screen examples displayed on the first wireless terminal device 300 and the second wireless terminal device 400 according to the first embodiment of the present disclosure. Such display screens will be described in detail with reference to the sequence chart shown in FIG. 8.

FIG. 8 is a sequence chart showing communication processing between each apparatus included in a communication system 100 according to the first embodiment of the present disclosure.

FIG. 8 shows an example in which each of the first wireless terminal device 300 and the second wireless terminal device 400 holds USIM information and the use right of the USIM information is transferred through the validity control by the authentication control unit 210 in the network control apparatus 200. In addition, description will be given of an example of communication processing when the first wireless terminal device 300 performs a transfer request to the second wireless terminal device 400 when the second wireless terminal device 400 holds valid USIM information with reference to FIG. 8.

First, a display screen for a USIM information transfer operation (a transfer request operation for the use right of the USIM information) is displayed on the display unit 370 of the first wireless terminal device 300.

Figure 6A:
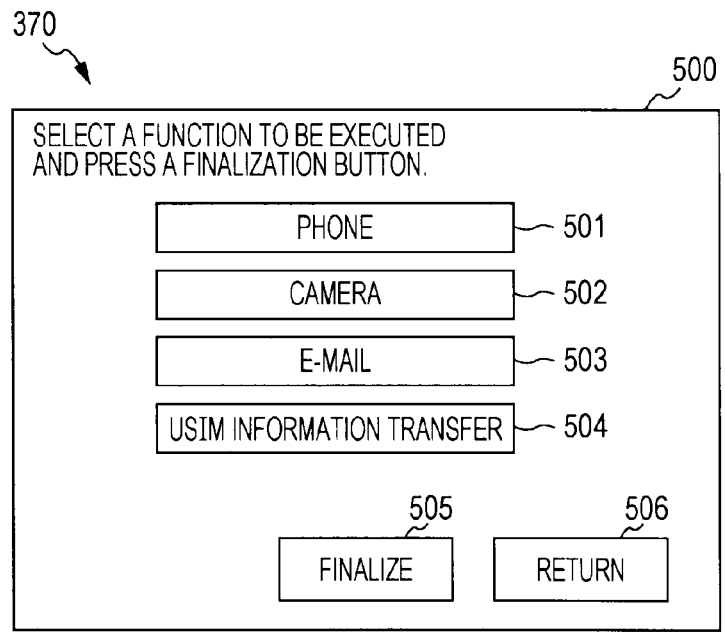
FIGS. 6A and 6B are diagrams showing display screen examples displayed on a first wireless terminal device and a second wireless terminal device according to the first embodiment of the present disclosure.

FIG. 6A shows an example (display screen 500) for the information transfer operation. The display screen 500 is a display screen on which a function to be executed by the first wireless terminal device 300 is selected. Specifically, the display screen 500 is provided with a telephone button 501, a camera button 502, an E-mail button 503, a USIM information transfer button 504, a finalization button 505, and a return button 506.

The telephone button 501 is a button pressed when a telephone call function is used, the camera button 502 is a button pressed when a camera function is used, and the E-mail button 503 is a button pressed when an E-mail function is used.

The USIM information transfer button 504 is a button pressed when the use right of valid USIM information held by another wireless terminal device is transferred. In addition, the USIM information transfer button 504 is not displayed when the USIM information storage unit 350 holds valid USIM information.

The finalization button 505 is a button pressed when a pressing operation for selecting any one of the telephone button 501, the camera button 502, the E-mail button 503, and the USIM information transfer button 504 is performed and the selection is then finalized.

The return button 506 is a button pressed to return to the display screen which was previously displayed. In addition, the return buttons 514 and 533 shown in FIGS. 6B and 7B are the same.

Here, it is assumed that the finalization button 505 is pressed after the USIM information transfer button 504 is pressed, on the display screen 500 shown in FIG. 6A (401). When the USIM information transfer operation is received as described above (401), a display screen for inputting the terminal specifying information is displayed on the display unit 370 of the first wireless terminal device 300.

Figure 6B:
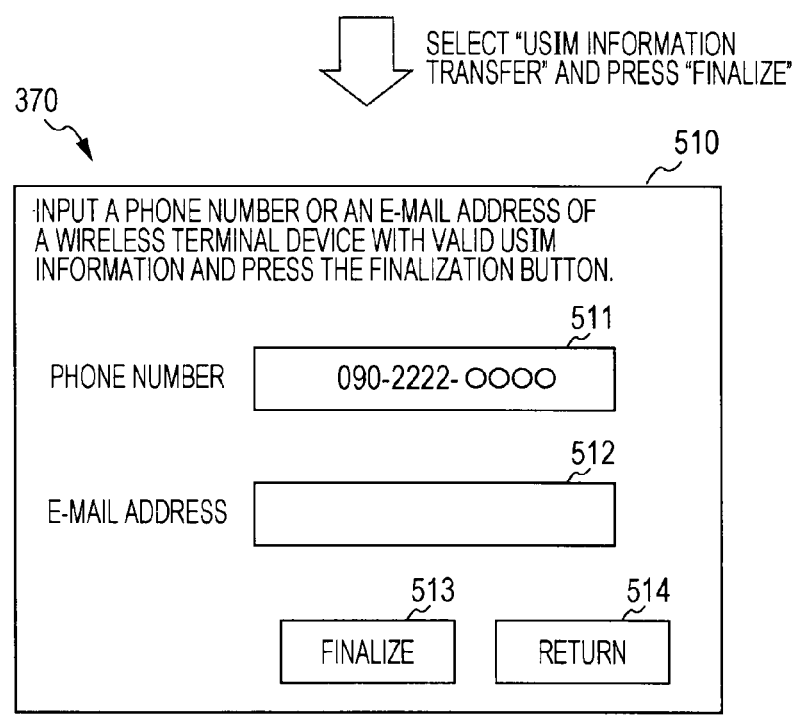

FIG. 6B shows an example of the display screen (display screen 510) for inputting the terminal specifying information. The display screen 510 is a display screen for inputting the terminal specifying information for specifying the wireless terminal device as a transfer source from which the use right of the USIM information is transferred. Specifically, the display screen 510 is provided with a phone number inputting section 511, an E-mail address inputting section 512, a finalization button 513, and a return button 514.

The phone number inputting section 511 is a region in which the phone number of the wireless terminal device as a transfer source is input as terminal specifying information of the wireless terminal device as the transfer source from which the use right of the USIM information is transferred.

The E-mail address inputting section 512 is a region in which the E-mail address of the wireless terminal device as the transfer source is input as the terminal specifying information of the wireless terminal device as the transfer source from which the use right of the USIM information is transferred. A specific example will be shown in which the wireless terminal device as the transfer source is specified by inputting any one of the phone number and the E-mail address of the wireless terminal device as the transfer source. In addition, input to the phone number inputting section 511 and the E-mail address inputting section 512 are performed through the input of operations by the operating unit 360.

The finalization button 513 is a button pressed when the input operation is performed on the phone number inputting section 511 or the E-mail address inputting section 512 and the input is then finalized.

Here, it is assumed that an input operation (090-2222-OOOO) is performed on the phone number inputting section 511 on the display screen 510 shown in FIG. 6B and the finalization button 513 is then pressed (402). As described above, the terminal specifying information of the wireless terminal device as the transfer source (transfer requested terminal) from which the use right of the USIM information is transferred is input (402). In such a case, the USIM information transfer request including the thus input terminal specifying information is transmitted from the first wireless terminal device 300 to the authentication control unit 210 of the network control apparatus 200 (403, 404). In addition, the USIM information transfer request includes terminal specifying information of the transfer requesting terminal (transfer destination) as well as the terminal specifying information of the transfer requested terminal (transfer source). Moreover, the USIM information transfer request is transmitted from the first wireless terminal device 300 to the authentication control unit 210 of the network control apparatus 200 through the aforementioned limited connection.

When the USIM information transfer request is received by the authentication control unit 210 (404), the contents of the wireless terminal device management database 220 is confirmed, and the USIM information transfer request is then transmitted to the wireless terminal device specified by the terminal specifying information included in the received USIM information transfer request (405). In this example, the USIM information transfer request is transmitted to the second wireless terminal device 400 corresponding to the terminal specifying information (090-2222-OOOO) (405). When the USIM information transfer request is received, the authentication control unit 210 checks whether or not the wireless terminal device specified by the terminal specifying information included in the USIM information transfer request holds valid USIM information, with the use of the wireless terminal device management database 220. In addition, the authentication control unit 210 obtains various kinds of information (a phone number, an E-mail address, and the like) relating to the transfer destination (first wireless terminal device 300) to be displayed on the transfer source (second wireless terminal device 400) from the wireless terminal device management database 220. Then, the authentication control unit 210 transmits the obtained USIM information transfer request including various kinds of information relating to the transfer destination (first wireless terminal device 300) (405).

When the second wireless terminal device 400 transmits the USIM information transfer request (406), a display screen for allowing the user to confirm the transfer of the use right of the USIM information is displayed on the display unit 370 of the second wireless terminal device 400 (407).

Figure 7A:
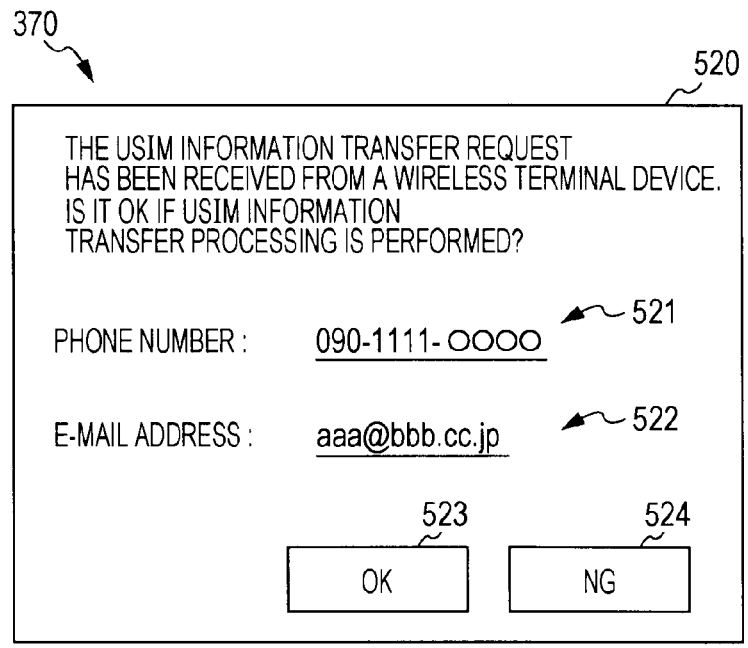
FIGS. 7A and 7B are diagrams showing display screen examples displayed on a first wireless terminal device and a second wireless terminal device according to the first embodiment of the present disclosure.
Figure 7B:
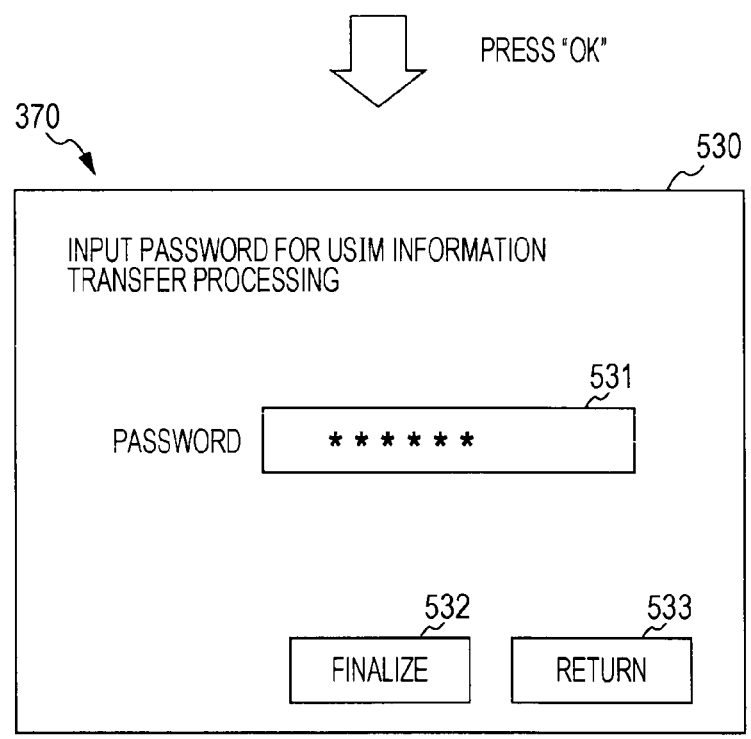

FIG. 7A shows an example of the display screen (display screen 520) for allowing the user to confirm the transfer of the use right of the USIM information. The display screen 520 is a display screen which displays the information for specifying a wireless terminal device as a transfer destination to which the use right of the USIM information is transferred and allows the user to confirm the transfer of the USIM information. Specifically, the display screen 520 is provided with a phone number display section 521, an E-mail address display section 522, an OK button 523, and an CANCEL button 524.

The phone number display section 521 is a region in which the phone number of the wireless terminal device as the transfer destination is displayed as the terminal specifying information of the wireless terminal device as the transfer destination to which the use right of the USIM information is transferred.

The E-mail address display section 522 is a region in which the E-mail address of the wireless terminal device as the transfer destination is displayed as the terminal specifying information of the wireless terminal device as the transfer destination to which the use right of the USIM information is transferred.

An example will be shown in which the phone number and the E-mail address of the wireless terminal device as the transfer destination are shown at the same time to notify the user of the wireless terminal device as the transfer destination. In addition, other information (the name of the owner, for example) included in the USIM information transfer request transmitted from the authentication control unit 210 may be displayed on the display screen 520. Alternatively, other information (the name of the owner, for example) relating to the wireless terminal device as the transfer destination may be displayed along with the phone number and the E-mail address based on the registration information (telephone book, for example) held in the second wireless terminal device 400, for example.

The OK button 523 is a button pressed when the user confirms that the use right of the USIM information will be transferred to the wireless terminal device whose terminal specifying information is displayed on the phone number display section 521 and the E-mail address display section 522.

The CANCEL button 524 is a button pressed when the user does not permit that the use right of the USIM information will be transferred to the wireless terminal device whose terminal specifying information is displayed on the phone number display section 521 and the E-mail address display section 522.

Here, it is assumed that the OK button 523 is pressed on the display screen 520 shown in FIG. 7A (407). When the OK button 523 is pressed after confirming the transfer of the use right of the USIM information as described above (407), a display screen on which a password used for transferring the use right of the USIM information is input is displayed on the display unit 370 of the second wireless terminal device 400 (408).

FIG. 7B shows an example of a display screen (display screen 530) on which a password is input. The display screen 530 is a display screen on which a password used for transferring the use right of the USIM information is input. Specifically, the display screen 530 is provided with a password input section 531, a finalization button 532, and a return button 533.

The password input section 531 is a region in which a password used for transferring the use right of the USIM information is input.

The finalization button 532 is a button pressed when an input operation is performed on the password input section 531 and the input is then finalized.

Here, it is assumed that a password "123abc (shown as "****" in FIG. 7B since the password is not displayed on the actual screen from the viewpoint of security)" is input on the display screen 530 shown in FIG. 7B (408). When the password is input as described above (408), the control unit 330 of the second wireless terminal device 400 performs authentication processing of the input password (409). Then, when the input password is authenticated (409), the USIM information transfer permission (transfer information) representing the permission of the transfer of the use right of the USIM information is transmitted from the second wireless terminal device 400 to the authentication control unit 210 of the network control apparatus 200 (410, 411). When the input password is not authenticated (409**), a display screen for prompting an input of a correct password is displayed.

Subsequently, when the authentication control unit 210 receives the USIM information transfer permission (411), the USIM information invalidation information which is for invalidating the USIM information of the wireless terminal device whose USIM information transfer permission has been transmitted is transmitted to the second wireless terminal device 400 (412, 413). When the USIM information invalidation information is received by the second wireless terminal device 400 (413), invalidation processing of the USIM information stored on the USIM information storage unit 350 of the second wireless terminal device 400 is performed (414). In so doing, the USIM information held by the second wireless terminal device 400 is invalidated, and the USIM information becomes unavailable for the second wireless terminal device 400.

After the completion of the invalidation processing of the USIM information (414), USIM information invalidation confirmation information indicating that the USIM information Invalidation processing has been completed is transmitted from the second wireless terminal device 400 to the authentication control unit 210 of the network control apparatus 200 (415, 416).

When the authentication control unit 210 receives the USIM information invalidation confirmation information (416), USIM information invalidation information which is for validating the USIM information of the wireless terminal device which has sent the USIM information transfer request is transmitted to the first wireless terminal device 300 (417, 418). When the USIM information validation information (transfer information) is received by the first wireless terminal device 300 (418), the validation processing of the information stored on the USIM information storage unit 350 of the first wireless terminal device is performed (419). In so doing, the USIM information held by the first wireless terminal device 300 is validated, and the USIM information becomes available for the first wireless terminal device 300.

After the completion of the USIM information validation processing (419), USIM information validation confirmation information indicating that the USIM information validation processing has been completed is transmitted from the first wireless terminal device 300 to the authentication control unit 210 of the network control apparatus 200 (420, 421). When the USIM information validation information is received by the authentication control unit 210 (421), the contents of the terminal management database 220 is rewritten. That is, the contents of the wireless terminal device management database 220 is rewritten such that the first wireless terminal device 300 is valid while the second wireless terminal device 400 is invalid.

Subsequently, USIM information transfer completion information indicating that the USIM information transfer processing has been completed is transmitted from the authentication control unit 210 of the network control apparatus 200 to the second wireless terminal device 400 (422, 423). Similarly, the USIM information transfer completion information is transmitted from the authentication control unit 210 of the network control apparatus 200 to the first wireless terminal device 300 (424, 425).

Although an example was described in which the use right of the USIM information is transferred by validating and invalidating the USIM information, the use right of the USIM information may be transferred by transferring the USIM information itself. In such a case, when the USIM information transfer request is transmitted to the second wireless terminal device 400, the USIM information held by the, second wireless terminal device 400 is invalidated (deleted), and the transfer information is transmitted from the second wireless terminal device 400 or the network control apparatus 200. The information storage unit 350 is made to store the USIM information included in the transfer information, and the valid USIM information is thus set.

[Operation Example of Communication System]

Next, description will be given of the operations of the communication system 100 according to the first embodiment of the present disclosure with reference to the drawings.

[Operation Example of Wireless Terminal Device (Transfer Destination of Use Right of USIM Information)]

Figure 9:
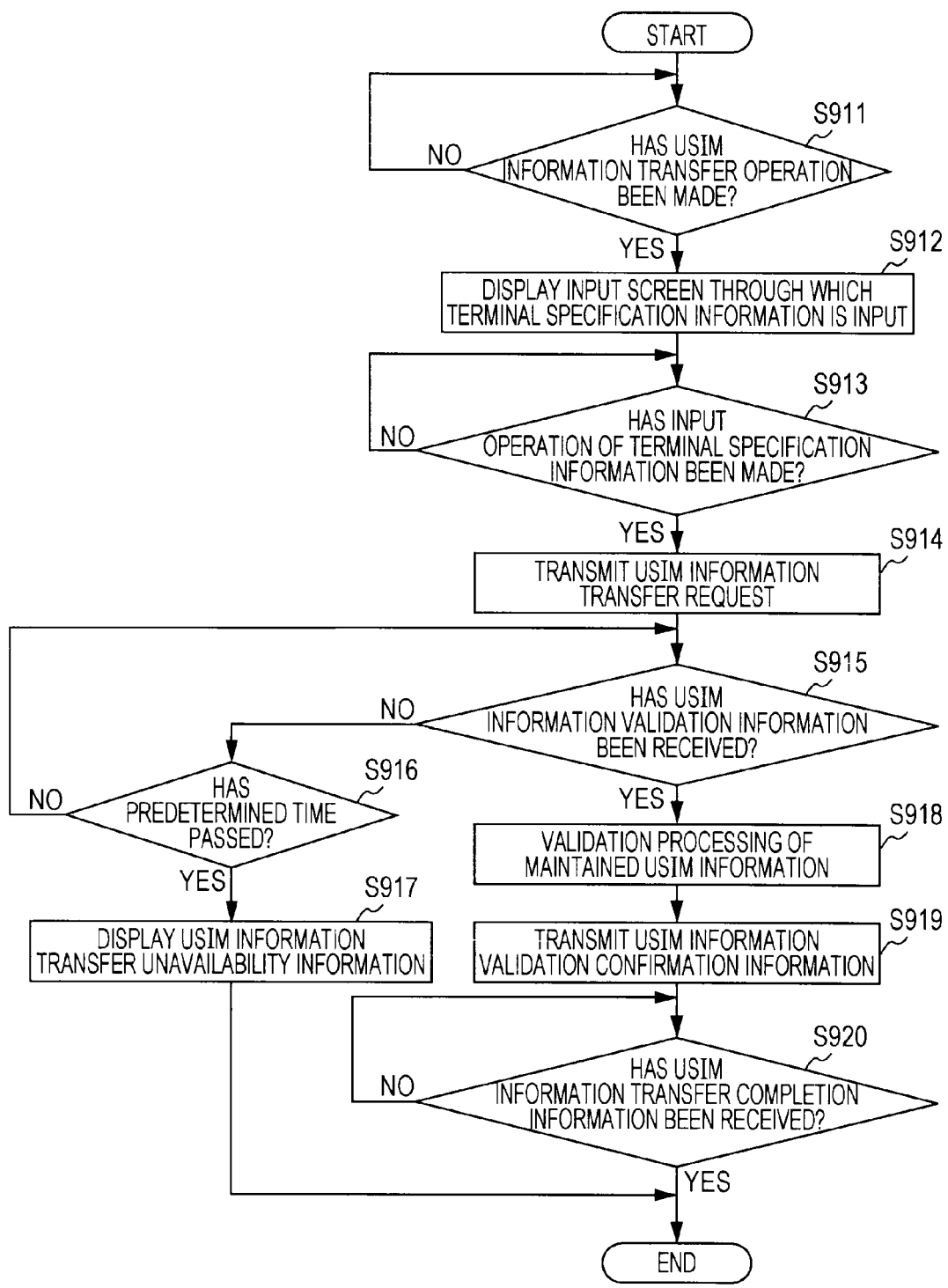
FIG. 9 is a flowchart showing an example of procedures of communication processing by a first wireless terminal device according to the first embodiment of the present disclosure.

FIG. 9 is a flowchart showing an example of procedures of communication processing by the first wireless terminal device 300 according to the first embodiment of the present disclosure. In FIG. 9, description will be given of an example in which the first wireless terminal device 300 is the transfer destination of the use right of the USIM information. In FIG. 9, an example will be shown in which both the first wireless terminal device 300 and the second wireless terminal device 400 hold USIM information and the use right of the USIM information is transferred through the validity control by the authentication control unit 210 of the network control apparatus 200.

First, the control unit 330 determines whether or not the USIM information transfer operation has been performed (Step S911), and monitoring is continued when the USIM information transfer operation has not been performed.

When the USIM information transfer operation has been performed (Step S911), the control unit 330 causes the display unit 370 to display a display screen on which the terminal specifying information of the wireless terminal device as the transfer source (transfer requested terminal) has been input from which the use right of the USIM information is transferred (Step S912). Subsequently, the control unit 330 determines whether or not the terminal specifying information of the transfer requested wireless terminal device has been input on the display screen (Step S913), and monitoring is continued when the input operation has not been performed.

When the terminal specifying information of the transfer requested wireless terminal device has been input (Step S913), the control unit 330 transmits the USIM information transfer request including the input terminal specifying information to the authentication control unit 210 of the network control apparatus 200 (Step S914). This USIM information transfer request is performed through the aforementioned limited connection. In addition, Steps S911 to S914 are one example of the transmission control procedure described in the appended claims.

Subsequently, the control unit 330 determines whether or not the USIM information validation information which is for validating the USIM information stored on the USIM information storage unit 350 has been received (Step S915). When the USIM information validation information has not been received (Step S915), the control unit 330 determines whether or not a predetermined time period has been passed after the transmission of the USIM information transfer request (Step S916). When the predetermined time period has not been passed after the transmission of the USIM information transfer request (Step S916), the processing returns to Step S915. On the other hand, when the predetermined time period has passed after the transmission of the USIM information transfer (Step S916), the control unit 330 causes the display unit 370 to display transfer refusal information which is for notifying that the transfer of the use right of the USIM information is not available (Step S917) and completes the operations of the communication processing.

When the USIM information validation information has been received (Step S915), the control unit 330 performs validation processing of the USIM information stored on the USIM information storage unit 350 (Step S918). In so doing, the USIM information stored on the USIM information storage unit 350 is validated, and the USIM information becomes available for the first wireless terminal device 300. In addition, Step S915 is an example of the receiving procedure described in the appended claims. Moreover, Step S918 is an example of the control procedure described in the appended claims.

Subsequently, the control unit 330 transmits the USIM information validation confirmation information indicating that the USIM information validation processing has been completed to the authentication control unit 210 of the network control apparatus 200 (Step S919). Then, the control unit 330 determines whether or not the USIM information transfer completion information indicating that the USIM information transfer processing has been completed has been received (Step S920), and monitoring is continued when the USIM information transfer completion information has not been received. When the USIM information transfer completion information has been received (Step S920), the operations of the communication processing are completed.

[Operation Example of Wireless Terminal Device (Transfer Source of Use Right of USIM Information)]

Figure 10:
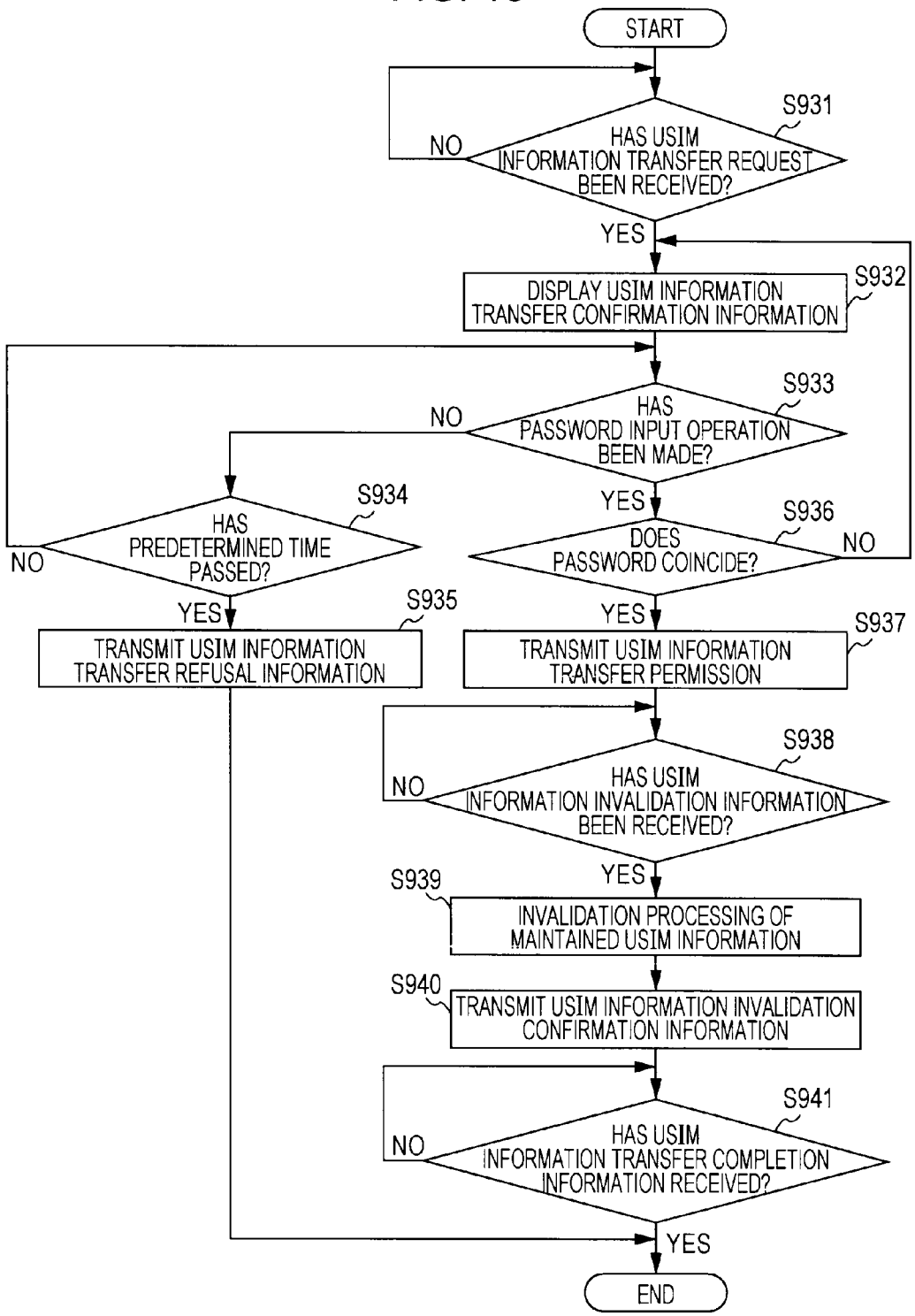
FIG. 10 is a flowchart showing an example of procedures of communication processing by a second wireless terminal device according to the first embodiment of the present disclosure.

FIG. 10 is a flowchart showing an example of the procedures of communication processing by the second wireless terminal device 400 according to the first embodiment of the present disclosure. In FIG. 10, a description will be given of an example in which the second wireless terminal device 400 is the transfer source of the use right of the USIM information. In addition, an example will be shown in which both the first wireless terminal device 300 and the second wireless terminal device 400 hold USIM information and the use right of the USIM information is transferred through the validity control by the authentication control unit 210 of the network control apparatus 200.

First, the control unit 330 determines whether or not the USIM information transfer request has been received (Step S931), and monitoring is continued when the USIM information transfer request has not been received.

When the USIM information transfer request has been received (Step S931), the control unit 330 causes the display unit 370 to display a display screen which is for allowing the user to confirm the transfer of the use right of the USIM information (Step S932). After the transfer confirmation by the display screen, the control unit 330 causes the display unit 370 to display a display screen (password input screen) on which a password used for transferring the use right of the USIM information is input (Step S932).

Subsequently, the control unit 330 determines whether or not a password input operation has been performed on the password input screen (Step S933). When the password input operation has not been performed (Step S933), the control unit 330 determines whether or not a predetermined time period has passed after the display of the password input screen (Step S934). When the predetermined time period has not passed after the display of the password input screen (Step S934), the processing returns to Step S933. On the other hand, when the predetermined time period has passed after the display of the password input screen (Step S934), the control unit 330 transmits the transfer refusal information which is for notifying that the transfer of the use right of the USIM information is not available to the authentication control unit 210 (Step S935) and completes the operations of the communication processing.

When the password input operation has been performed (Step S933), the control unit 330 determines whether or not the input password coincides with the registered password (Step S936). That is, password authentication processing is performed. When the input password does not coincide with the registered password (Step S936), the processing returns to Step S932, and the control unit 330 causes the display unit 370 to display a display screen which is for prompting an input of a correct password.

When the input password coincides with the registered password (Step S936), the control unit 330 transmits the USIM information transfer permission which is for permitting the transfer of the use right of the USIM information to the authentication control unit 210 (Step S937).

Subsequently, the control unit 330 determines whether or not the USIM information invalidation information which is for invalidating the USIM information stored on the USIM information storage unit 350 has been received (Step S938), and monitoring is continued when the USIM information invalidation information has not been received. On the other hand, when the USIM information invalidation information has been received (Step S938), the control unit 330 performs invalidation processing of the USIM information stored on the USIM information storage unit 350 (Step S939). In so doing, the USIM information stored on the USIM information storage unit 350 is invalidated, and the USIM information becomes unavailable for the second wireless terminal device 400.

Subsequently, the control unit 330 transmits USIM information invalidation confirmation information to the authentication control unit 210 of the network control apparatus 200 (Step S940). Subsequently, the control unit 330 determines whether or not the USIM information transfer completion information indicating that the USIM information transfer processing has been completed has been received (Step S941), and monitoring is continued when the USIM information transfer completion information has not been received. When the USIM information transfer completion information has been received (Step S941), the operations of the communication processing are completed.

[Configuration Example of Wireless Terminal Device Management Database]

The above description was given of the example in which the use right of the USIM information is transferred between two wireless terminal devices. However, it is also possible to apply the first embodiment of the present disclosure to the case where the use right of the USIM information is transferred among three or more wireless terminal devices. An example of the contents of the wireless terminal device management database 220 when the use right of the USIM information is transferred among three or more wireless terminal devices will be shown FIG. 11.

FIG. 11 is a diagram schematically showing the wireless terminal device management database 220 according to the first embodiment of the present disclosure.

Although the wireless terminal device management database 220 shown in FIG. 11 is different from that in FIG. 4 in that the number of the wireless terminal devices as management targets is three or more, the other configurations are substantially the same as those in FIG. 4.

For example, when a user owns M (M≥3) wireless terminal devices, it is possible to validate the USIM information of one wireless terminal device among M wireless terminal devices and invalidate the USIM information of the other wireless terminal devices. In such a case, "valid" is stored on one section while "invalid" is stored on the other sections from among the validity information 224 of the wireless terminal device management database 220 shown in FIG. 11.

For example, when a user owns M (M≥3) wireless terminal devices, it is possible to validate the USIM information of N (1<N<M) wireless terminal devices among M wireless terminal devices and invalidate the USIM information for the other wireless terminal devices. In such a case, "valid" is stored on N sections while "invalid" is stored on the other sections from among the validity information 224 of the wireless terminal device management database 220 shown in FIG. 11.

In the first embodiment of the present disclosure, an example was shown in which the use right of the USIM information is transferred between wireless terminal devices when a user owns a plurality of wireless terminal devices. However, it is also possible to apply the first embodiment of the present disclosure to a case in which the use right of the USIM information is transferred between wireless terminal devices (a plurality of wireless terminal devices) owned by each of a plurality of users. For example, a group (of five people, for example) in which each user owns one wireless terminal device is assumed. In such a case, it is possible to validate only the USIM information of the wireless terminal devices of two people from among five people of the group and invalidate the USIM information of the wireless terminal devices of the other three people. In such a case, it is possible to perform transfer processing between members belonging to a registered group by registering the group in the wireless terminal device management database 220 shown in FIG. 11. When the transfer processing is performed among members, the contracts with the wireless business operator is necessary by the number of the USIM information items capable of being transferred among members.

As described above, according to the first embodiment, it is possible to easily perform the transfer processing of valid USIM information (contract authentication information) among a plurality of wireless terminal devices with simple user operations. Accordingly, when a person individually owns a plurality of wireless terminal devices, it is possible to easily use a plurality of wireless terminal devices without the contract for a plurality of wireless connection services. In addition, even when a plurality of wireless terminal devices is used, it is not necessary to replace the UICC card between wireless terminal devices. With such a configuration, it is possible to easily share the USIM information (contract authentication information) among a plurality of wireless terminal devices.

2. Second Embodiment

In the first embodiment of the present disclosure, an example was shown in which the use right of the USIM information is transferred among a plurality of wireless terminal devices in a state where the user can operate. However, a case is also assumed in which the user operation is not available for the wireless terminal device (second wireless terminal device 400) which holds valid USIM information as shown in FIG. 1B. Thus, an example will be shown in which the use right of the USIM information is transferred when the user operation is not available for the wireless terminal device which holds valid USIM information in the second embodiment of the present disclosure. In addition, the configuration of the communication system according to the second embodiment of the present disclosure is substantially the same as that in the example shown in FIGS. 1A and 1B and the like. Therefore, the reference numerals are provided to the common parts to those in the first embodiment of the present disclosure, and the description thereof will be partially omitted.

[Communication Example Between Terminals]

Figure 12:
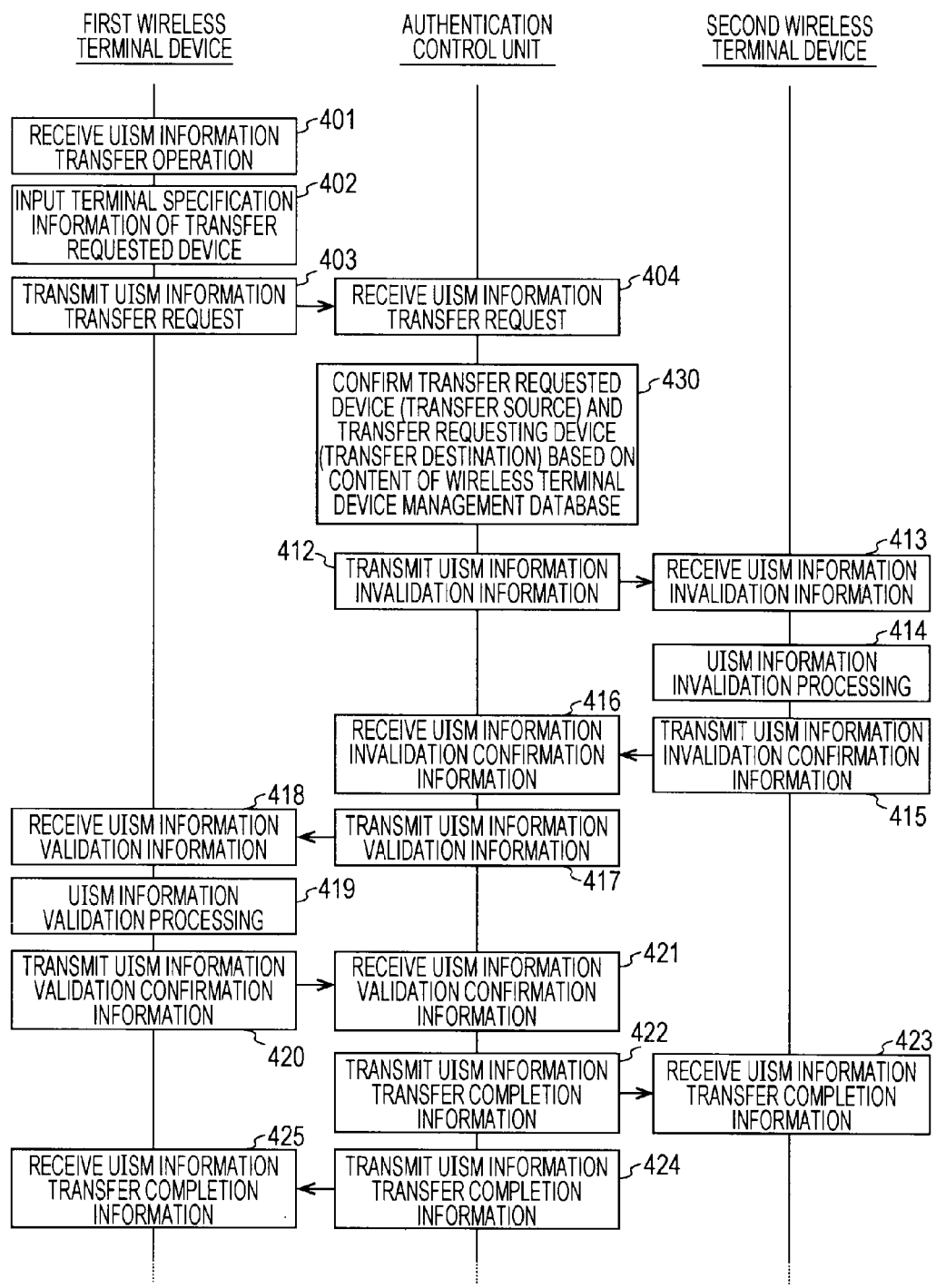
FIG. 12 is a sequence chart showing communication processing between each apparatus included in a communication system according to the second embodiment of the present disclosure.

FIG. 12 is a sequence chart showing communication processing between terminals included in the communication system 100 according to the second embodiment of the present disclosure. Since the sequence chart shown in FIG. 12 is a modified example of FIG. 8, the same reference numerals are provided to common parts to those in FIG. 8, and description thereof will partially be omitted.

When the USIM information transfer request is received (404), the authentication control unit 210 checks the wireless terminal devices as the transfer requested terminal (transfer source) and the transfer requesting terminal (transfer destination) based on the contents of the wireless terminal device management database 220 (430). That is, the authentication control unit 210 checks the wireless terminal devices as the transfer requested terminal (transfer source) and the transfer requesting terminal (transfer destination) specified by the terminal specifying information included in the received USIM information transfer request.

Subsequently, the authentication control unit 210 transmits the USIM information invalidation information which is for invalidating the USIM information of the transfer requested terminal (transfer source) to the transfer requested terminal (transfer source) (second wireless terminal device 400) after the confirmation (412, 413).

An example will be shown in which the authentication control unit 210 transmits the USIM information validation information to the first wireless terminal device 300 (417) when the USIM information invalidation confirmation information is received from the second wireless terminal device 400 (416). However, another case is also assumed in which the power of the transfer requested wireless terminal device (transfer source) is off, or in which the transfer requested wireless terminal device (transfer source) is out of the service. Thus, the USIM information validation information may be transmitted to the transfer requesting wireless terminal device (transfer destination) when predetermined conditions are satisfied even if the USIM information invalidation confirmation information has not been received from the transfer requested wireless terminal device (transfer source). The predetermined conditions may be conditions in which the user of the transfer requested terminal (transfer source) made such a setting in advance and in which the USIM information invalidation confirmation information has not been received from the transfer requested terminal (transfer source) even after a predetermined time period has passed, for example.

However, if the USIM information validation information is transmitted to the transfer requesting terminal (transfer destination) when the USIM information invalidation confirmation information has not been received from the transfer requested terminal (transfer source), the USIM information of both the transfer requesting terminal (transfer destination) and the transfer requested terminal (transfer source) is validated. In such a case, access from the transfer requested wireless terminal (transfer source) to the base station is permitted if the power of the transfer requested terminal (transfer source) is on or the transfer requested terminal (transfer source) is in service. Thus, when the USIM information invalidation confirmation information has not been received from the transfer requested terminal (transfer source) and predetermined conditions are satisfied, the authentication control unit 210 rewrites the contents of the wireless terminal device management database 220. That is, the authentication control unit 210 rewrites the contents of the wireless terminal device management database 220 such that the USIM information of the transfer requesting terminal (transfer destination) is valid while the USIM information of the transfer requested terminal (transfer source) is invalid. In addition, the authentication control unit 210 causes each base station to hold information (invalid information) indicating that the USIM information of the transfer requested terminal (transfer source) is invalid. When such invalid information is held by each base station, and the transfer requested wireless terminal device (transfer source) accesses the base station, the USIM information invalidation information is transmitted from the base station to the transfer requested wireless terminal device (transfer source). As described above, the authentication control unit 210 transmits the USIM information validation information to the transfer requesting terminal (transfer destination) after the contents of the wireless terminal device management database 220 is rewritten and each base station is made to hold the invalid information.

For example, in the example shown in FIG. 12, the authentication control unit 210 rewrites the contents of the wireless terminal device management database 220 when the USIM information invalidation confirmation information has not been received from the second wireless terminal device 400 and the predetermined conditions are satisfied. That is, the authentication control unit 210 rewrites the contents of the wireless terminal device management database 220 such that the USIM information of the first wireless terminal device 300 is valid while the USIM information of the second wireless terminal device 400 is invalid. In addition, the authentication control unit 210 causes the base stations 230 and 240 to hold the information (invalid information) indicating that the second wireless terminal device 400 is invalid. When the base stations 230 and 240 hold the invalid information, and the second wireless terminal device 400 accesses one of the base stations 230 and 240, the USIM information invalidation information is transmitted from the base station to the second wireless terminal device 400. As described above, the authentication control unit 210 transmits the USIM information validation information to the first wireless terminal device 300 after the contents of the wireless terminal device management database 220 are rewritten and the base stations 230 and 240 are made to hold the invalid information.

As described above, according to the second embodiment of the present disclosure, it is not necessary to carry the wireless terminal device which holds the USIM information (contract authentication information) when the USIM information (contract authentication information) is shared among a plurality of wireless terminal devices. For example, a user who left a wireless mobile terminal (a mobile phone device, for example) at home can use another wireless mobile terminal of someone else as the user's own wireless mobile terminal even when the user is away from home. In so doing, it is possible to further easily share the USIM information (contract authentication information) among a plurality of wireless terminal devices.

In addition, it is also possible to apply the embodiments of the present disclosure to a mobile wireless terminal device (a wireless terminal device for data communication, for example) or a fixed wireless terminal device (a wireless terminal device for the purpose of collecting data from automatic vending machines).

In addition, the embodiments are shown as examples for implementing the present disclosure, and the components in the embodiments respectively have correspondence relationships with those in the appended claims as clearly specified in the embodiments. Similarly, the components in the appended claims respectively have correspondence relationships with those in the embodiment, to which the same names are provided. However, the present disclosure is not limited to the embodiments and can be implemented by adding various modifications thereto within the scope of the present disclosure.

In addition, the processing procedures described in the embodiments of the present disclosure may be understood as a method including a series of such procedures, or may be understood as a program which causes a computer to execute a series of such procedures or a recording medium which stores such a program. As such a recording medium, it is possible to use a CD (Compact Disc), a MD (MiniDisc), a DVD (Digital Versatile Disc), a memory card, a Blu-ray Disc (registered trademark), or the like.

The present disclosure contains subject matter related to that disclosed in Japanese Priority Patent Application JP 2010-251993 filed in the Japan Patent Office on Nov. 10, 2010, the entire contents of which are hereby incorporated by reference.

What is claimed is:

1. A wireless terminal device comprising:
circuitry configured to:
transmit a transfer request, via a wireless line operated by a wireless business operator providing wireless connection services on the wireless line by a limited connection performed without using contract authentication information, to the wireless business operator, the transfer request requesting transfer of a use right of the contract authentication information relating to the wireless business operator providing wireless connection services, and the contract authentication information being held by a second wireless terminal device as another wireless terminal device, when a predetermined operation is input;
receive transfer information, which is transmitted via the wireless line in response to the transfer request for transferring the use right held by the second wireless terminal device, the transfer information including the contract authentication information held by the second wireless terminal device and the contract authentication information received while the second wireless terminal device is unavailable; and
set valid contract authentication information relating to the wireless operator providing wireless connection services in the wireless terminal device, as a first wireless terminal device, based on the received transfer information, the second wireless terminal device continuing to hold the use right of the contract authentication information relating to the wireless operator providing wireless connection services.

2. The wireless terminal device according to claim 1, wherein the transfer information includes validation information which is for validating the contract authentication information held by a memory, and
wherein the circuitry is configured to set the valid contract authentication information by validating the contract authentication information held by the memory based on the validation information included in the received transfer information.

3. The wireless terminal device according to claim 2, wherein the circuitry is configured to:
transmit the transfer request to a network control apparatus with a database which manages the contract authentication information which is respectively held by the wireless terminal device and the second wireless terminal device, and set the valid contract authentication information based on the transfer information which is transmitted from the network control apparatus based on management by the database.

4. The wireless terminal device according to claim 3, wherein the network control apparatus is configured to validate the contract authentication information held by the memory by transmitting the transfer information to the wireless terminal device in response to the transfer request and performs control so as to invalidate the contract authentication information held by the second wireless terminal device, and wherein the circuitry is configured to set the valid contract authentication information based on control by the network control apparatus.

5. The wireless terminal device according to claim 1, wherein the circuitry is configured to:
set the valid contract authentication information by causing the memory to hold the contract authentication information included in the received transfer information.

6. The wireless terminal device according to claim 1, wherein the circuitry is configured to receive the transfer information before the contract authentication information held by the second wireless terminal device is invalidated.

7. The wireless terminal device according to claim 1, wherein the predetermined operation is an instructing operation by a user who instructs the transfer request.

8. The wireless terminal device according to claim 1, wherein the second wireless terminal device is off or out of service.

9. A network control apparatus comprising:
circuitry configured to:
receive a transfer request, via a wireless line operated by a wireless business operator providing wireless connection services on the wireless line by a limited connection performed without using contract authentication information, from a first wireless terminal device, the transfer request requesting transfer of a use right of the contract authentication information relating to the wireless business operator providing wireless connection services, and the contract authentication information being held by a second wireless terminal device and held by a memory; and
transmit transfer information which is for transferring the use right, held by the second wireless terminal device, when the transfer request is received, to the first wireless device, via a wireless line, the transfer information including the contract authentication information held by the second wireless terminal device and the contract authentication information transferred while the second wireless terminal device is unavailable, the second wireless terminal device continuing to hold the use right of the contract authentication information relating to the wireless operator providing wireless connection services.

10. The wireless terminal device according to claim 9, wherein the circuitry is configured to cause a display to display a confirmation screen, which allows a user to confirm the transfer of the use right when the transfer request is received, and transmit the transfer information via the wireless line when an operation of authorizing the transfer of the use right is input after the display of the confirmation screen.

11. The network control apparatus according to claim 9, wherein the circuitry is configured to transmit the transfer information when predetermined conditions are satisfied.

12. The network control apparatus according to claim 11, wherein the predetermined conditions are conditions set at the second wireless terminal device.

13. The network control apparatus according to claim 9, wherein the circuitry is configured to determine that the second wireless terminal device is unavailable when invalidation confirmation information regarding invalidating the contract authentication information for the second wireless terminal has not been received from the second wireless terminal device.

14. A communication system comprising:
a first wireless terminal device including
circuitry configured to:
transmit a transfer request, via a wireless line operated by a wireless business operator providing wireless connection services on the wireless line by a limited connection performed without using contract authentication information, to the wireless business operator, the transfer request requesting transfer of a use right of the contract authentication information relating to the wireless business operator providing wireless connection services, and the contract authentication information being held by a second wireless terminal device, when a predetermined operation is input,
receive transfer information which, is transmitted via the wireless line in response to the transfer request for transferring the use right held by the second wireless terminal device, the transfer information including the contract authentication information held by the second wireless terminal device and the contract authentication information received while the second wireless terminal device is unavailable, and
set valid contract authentication information relating to the wireless operator providing wireless connection services in the first wireless terminal device based on the received transfer information, the second wireless terminal device continuing to hold the use right of the contract authentication information relating to the wireless operator providing wireless connection services; and
a device network control apparatus including
circuitry configured to:
receive the transfer request from the first wireless terminal device via the wireless line, and
transmit the transfer information when the transfer request is received, via the wireless line.

15. A control method of a wireless terminal device comprising:
transmitting a transfer request, via a wireless line operated by a wireless business operator providing wireless connection services on the wireless line by a limited connection performed without using contract authentication information, to the wireless business operator, the transfer request requesting transfer of a use right of the contract authentication information relating to the wireless business operator providing wireless connection services, and the contract authentication information held by a second wireless terminal device as another wireless terminal device, when a predetermined operation is input;
receiving transfer information, which is transmitted via the wireless line in response to the transfer request for transferring the use right held by the second wireless terminal device, the transfer information including the contract authentication information held by the second wireless terminal device and the contract authentication information received while the second wireless terminal device is unavailable; and setting valid contract authentication information relating to the wireless operator providing wireless connection services in the wireless terminal device, as a first wireless terminal device based on the received transfer information, the second wireless terminal device continuing to hold the use right of the contract authentication information relating to the wireless operator providing wireless connection services.

\* \* \* \* \*